(12) United States Patent
Zeng

(10) Patent No.: US 10,437,088 B2
(45) Date of Patent: Oct. 8, 2019

(54) BACKLIGHT MODULE

(71) Applicant: Wuhan China Star Optoelectronics Technology Co., Ltd., Wuhan, Hubei (CN)

(72) Inventor: Jie Zeng, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 430 days.

(21) Appl. No.: 15/327,462

(22) PCT Filed: Dec. 27, 2016

(86) PCT No.: PCT/CN2016/112332
§ 371 (c)(1),
(2) Date: Jan. 19, 2017

(87) PCT Pub. No.: WO2018/112999
PCT Pub. Date: Jun. 28, 2018

(65) Prior Publication Data
US 2018/0210268 A1    Jul. 26, 2018

(30) Foreign Application Priority Data
Dec. 20, 2016   (CN) .......................... 2016 1 1183229

(51) Int. Cl.
*G02F 1/1333*    (2006.01)
*G02F 1/1335*    (2006.01)
*F21V 8/00*    (2006.01)

(52) U.S. Cl.
CPC ..... *G02F 1/133308* (2013.01); *G02B 6/0055* (2013.01); *G02B 6/0085* (2013.01);
(Continued)

(58) Field of Classification Search
CPC ......... G02F 1/133308; G02F 1/133603; G02F 1/133605; G02F 1/133608; G02F 2001/133628; G02B 6/0055; G02B 6/0085

See application file for complete search history.

(56) References Cited

U.S. PATENT DOCUMENTS 7,671,936 B2    3/2010    Chang
2013/0094246 A1*    4/2013    Kim .......................... G09F 9/35
                                                                362/613
(Continued)

FOREIGN PATENT DOCUMENTS

CN    1877417 A    12/2006
CN    104832837 A    8/2015
(Continued)

*Primary Examiner* — Thomas M Sember

(57) ABSTRACT

Disclosed is a backlight module. The backlight module includes: a light source flexible printed circuit; a light-emitting diode disposed on the light source flexible printed circuit; a reflector plate disposed on the light-emitting diode; a sealant frame and a light guide plate that are respectively disposed at two opposite sides of the light-emitting diode; an optical film disposed on the light guide plate; and an upper graphite sheet disposed on the reflector plate. The backlight module has a simple structure, can increase utilization efficiency of light, and has a good heat dissipation effect.

14 Claims, 2 Drawing Sheets

(52) U.S. Cl.
CPC .. *G02F 1/133603* (2013.01); *G02F 1/133605* (2013.01); *G02B 6/005* (2013.01); *G02B 6/0031* (2013.01); *G02F 1/133608* (2013.01); *G02F 2001/133314* (2013.01); *G02F 2001/133317* (2013.01); *G02F 2001/133628* (2013.01); *G02F 2202/28* (2013.01)

(56) References Cited

U.S. PATENT DOCUMENTS

2014/0185271 A1* 7/2014 Hyun .................. G02B 6/0021
362/84
2016/0327832 A1 11/2016 Zhu et al.
2016/0381317 A1 12/2016 Hosoki

FOREIGN PATENT DOCUMENTS

| CN | 105674147 A | 6/2016 |
|---|---|---|
| CN | 205579334 U | 9/2016 |
| CN | 205665500 U | 10/2016 |

\* cited by examiner

BACKLIGHT MODULE

CROSS-REFERENCE TO RELATED APPLICATIONS

This application claims the priority of Chinese patent application CN201611183229.9, entitled "Backlight module" and filed on Dec. 20, 2016, the entirety of which is incorporated herein by reference.

FIELD OF THE INVENTION

The present disclosure relates to the technical field of liquid crystal display, and in particular, to a backlight module.

BACKGROUND OF THE INVENTION

At present, a liquid crystal display device, as a display member of electronic devices, has been widely applied to various electronic products. A backlight module is an important part in a liquid crystal display device.

Generally, as shown in FIG. 1, a backlight module comprises a sealant frame 10, a reflector plate 20, a light guide plate 30, an optical film 40, a light source flexible printed circuit (FPC) 50, a light-emitting diode (LED) 60, and a light shielding adhesive 70. The light source flexible printed circuit 50 and the light-emitting diode 60 are fixed on the light guide plate 30 and the sealant frame 10 by means of the light shielding adhesive 70. The optical film 40 is fixed on the sealant frame 10 by means of a double faced adhesive tape 80. The reflector plate 20 is attached to the bottom surface of the sealant frame 10 by means of a rectangle shaped double faced adhesive tape 90. After assembly of the whole backlight module is completed, a display screen is attached to the backlight module by means of the light shielding adhesive 70. The light shielding adhesive 70 is generally a black adhesive, which can absorb light leaked from edges of the backlight module. At a light source side of the light-emitting diode 60, a layer of polyethylene glycol terephthalate (PET) 100 is attached on the light shielding adhesive 70. This can prevent a fracture in a thin film transistor due to suspension, and can also prevent the thin film transistor from being stuck to the light shielding adhesive, which is unfavorable for reprocessing.

As resolution of screens of mobile phones becomes higher, backlight brightness of the backlight module also needs to be enhanced correspondingly. Accordingly, heat generated from a side of a backlight light-emitting diode and a location of a chip increases. Moreover, with enhancement of backlight brightness of the backlight module, a risk of light leakage increases, and light to be absorbed by the light shielding adhesive also increases. In order to prevent a harmful effect on display due to heat accumulation, a heat dissipation structure needs to be added to the backlight module.

In order to solve the above problem, it is necessary to provide a new backlight module.

SUMMARY OF THE INVENTION

The backlight module of the present disclosure has a simple structure, can increase utilization efficiency of light, and has a good heat dissipation effect.

In order to achieve the above objective, the present disclosure provides a backlight module. The backlight module in the present disclosure comprises: a light source flexible printed circuit, a light-emitting diode which is disposed on the light source flexible printed circuit, a reflector plate which is disposed on the light-emitting diode. A sealant frame and a light guide plate are respectively disposed at two opposite sides of the light-emitting diode. An optical film is disposed on the light guide plate. An upper graphite sheet is disposed on the reflector plate.

A length of the upper graphite sheet is smaller than a length of the reflector plate.

The sealant frame is connected to the light source flexible printed circuit, and the sealant frame is connected to the reflector plate.

A light shielding adhesive is disposed on the optical film, and the light shielding adhesive is attached to the reflector plate.

A gap is provided between the light shielding adhesive and the upper graphite sheet.

A lower graphite sheet is disposed under the light source flexible printed circuit, and the lower graphite sheet is connected to the light guide plate.

The lower graphite sheet is attached to the light guide plate by means of a double faced adhesive tape.

The reflector plate is attached to the sealant frame by means of a double faced adhesive tape.

The light source flexible printed circuit is attached to the se by means of a double faced adhesive tape.

The optical film includes an upper prism sheet, a lower prism sheet and a diffusing sheet arranged sequentially from top to bottom.

The structure of the backlight module of the present disclosure is simple. A reflector plate can reflect light leaked from a side of a light-emitting diode so as to increase utilization efficiency of light, and meanwhile such a structure arrangement has a good heat dissipation effect. Graphite sheets can prevent a fracture in a thin film transistor due to suspension, and can also prevent the thin film transistor from being stuck to the light shielding adhesive, which is unfavorable for reprocessing.

The above technical features can be combined in various suitable manners or can be replaced by equivalent technical features as long as the objective of the present disclosure can be achieved.

BRIEF DESCRIPTION OF THE DRAWINGS

The accompanying drawings are used for explaining the present disclosure, rather than intending to restrict the scope of the present disclosure in any manner. Moreover, shapes, proportions and dimensions of respective components in the drawings are only schematic for better understanding the present disclosure, rather than specifically defining the shapes, proportions and dimensions of respective components in the present disclosure. In accordance with teachings of the present disclosure, those skilled in the art can select various possible shapes, proportions and dimensions, according to specific conditions, so as to implement the present disclosure.

In the accompanying drawings, same reference signs are used to refer to same components. The accompanying drawings are not drawn according to actual proportions.

DETAILED DESCRIPTION OF THE EMBODIMENTS

The present disclosure will be explained with reference to embodiments and accompanying drawings, so that one can better understand details of the present disclosure. However, the embodiments of the present disclosure described are only for explaining the purpose of the present disclosure, and should not be understood as restrictions to the present disclosure in any manner. In accordance teachings of the present disclosure, those skilled in the art can conceive any possible transformations on the basis of the present disclosure, and all the transformations should be regarded as being within the scope of the present disclosure. The present disclosure will be explained below in combination with the accompanying drawings.

Figure 1:
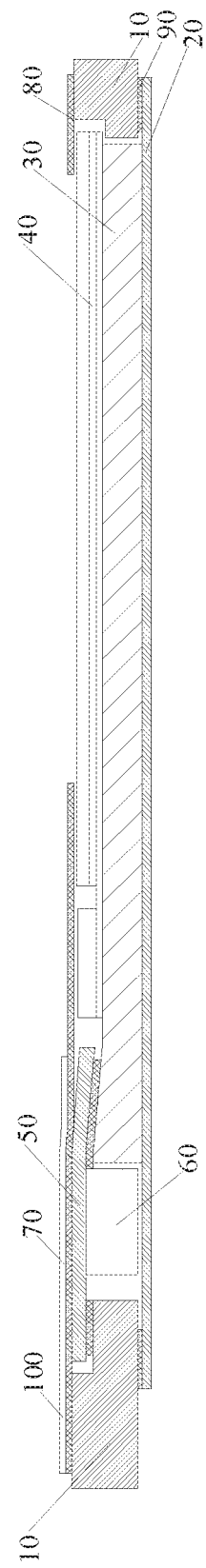
FIG. 1 schematically shows a structure of a backlight module in the prior art.
Figure 2:
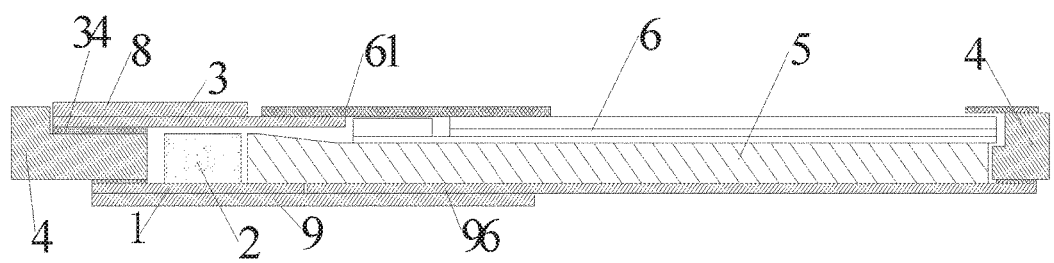
FIG. 2 schematically shows a structure of a backlight module in the present disclosure.

FIG. 1 and FIG. 2 respectively shows a structure of a backlight module in the prior art and a structure of a backlight module in the present disclosure.

As shown in FIG. 2, the backlight module in the present disclosure comprises a light source flexible printed circuit 1, a light-emitting diode 2, a reflector plate 3, a sealant frame 4, a light guide plate 5, an optical film 6, and an upper graphite sheet 8. The light-emitting diode 2 is disposed on the light source flexible printed circuit 1. The reflector plate 3 is disposed above the light-emitting diode 2. The sealant frame 4 and the light guide plate 5 are respectively disposed at two opposite sides of the light-emitting diode 2. The optical film 6 is disposed on the light guide plate 5. The upper graphite sheet 8 is disposed on the reflector plate 3.

The backlight module of the present disclosure can dissipate heat well, so that a harmful effect on display due to heat accumulation can be prevented effectively. The upper graphite sheet 8 can dissipate heat generated from a side of a backlight light-emitting diode and a location of a chip.

Furthermore, in the present disclosure, a length of the upper graphite sheet 8 is smaller than a length of the reflector plate 3. A light shielding adhesive 61 is disposed on the optical film 6. One end of the light shielding adhesive 61 is not attached to the sealant frame 4, but is attached to a part of the reflector plate 3 extending beyond the upper graphite sheet 8. In one embodiment, a gap is provided between the light shielding adhesive 61 and the upper graphite sheet 8. With such an arrangement, the reflector plate 3 can reflect leaked light back to the light guide plate 5. In this way, light leakage can be prevented, and utilization efficiency of light can be increased. The upper graphite sheet 8 serves to dissipate heat. Moreover, the upper graphite sheet 8 can prevent a fracture in a thin film transistor due to suspension, as well as preventing the thin film transistor from being attached to the light shielding adhesive 61, which is unfavorable for reprocessing.

In the present disclosure, the sealant frame 4 is connected to the light source flexible printed circuit 1, and the sealant frame 4 is connected to the reflector plate 3. In another embodiment, the reflector plate 3 is attached to the sealant frame 4 by means of a double faced adhesive tape 34, and the light source flexible printed circuit 1 is attached to the sealant frame 4 by means of a double faced adhesive tape 14. In this way, stability of the backlight module in the present disclosure is increased.

Furthermore, a lower graphite sheet 9 is disposed under the light source flexible printed circuit 1. The lower graphite sheet 9 is connected to the light guide plate 5. In this way, the heat dissipation performance of the backlight module is further enhanced. In another embodiment, the lower graphite sheet 9 is attached to the light guide plate 5 by means of a double faced adhesive tape 96, so that stability of the backlight module is further enhanced.

In the present disclosure, the optical film 6 includes an upper prism sheet, a lower prism sheet and a diffusing sheet arranged sequentially from top to bottom (which are not shown in FIG. 2).

The reflector plate 3 of the backlight module in the present disclosure can reflect light leaked from a side of the light-emitting diode back to the light guide plate 5. In this way, utilization efficiency of light can be increased. Besides, the upper graphite sheet 8 serves to dissipate heat. Moreover, the upper graphite sheet 8 can prevent a fracture in a thin film transistor due to suspension, as well as preventing the thin film transistor from being stuck to the light shielding adhesive 61, which is unfavorable for reprocessing.

The above technical solution is only one implementing manner of the present disclosure. For those skilled in the art, various types of improvement or transformation of the technical solution can be made easily based on the application method and principle disclosed in the present disclosure, and the technical solution is not limited to the method described in the above specific implementing forms. Although the present disclosure is described with reference to preferred embodiments, various improvements can be made to the embodiments, and components in the embodiments can be replaced by equivalent components without departing from the scope of the present disclosure. Particularly, as long as no structural conflict exists, respective technical features mentioned in respective embodiments can all be combined in any manner. The present disclosure is not limited to specific embodiments disclosed in the present text, but includes all technical solutions that fall into the scope of claims.

The invention claimed is:

1. A backlight module, which comprises:
   a light source flexible printed circuit,
   a light-emitting diode which is disposed on the light source flexible printed circuit, and
   a reflector plate which is disposed on the light-emitting diode,
   wherein a sealant frame and a light guide plate are respectively disposed at two opposite sides of the light-emitting diode,
   wherein an optical film is disposed on the light guide plate,
   and wherein an upper graphite sheet is disposed on the reflector plate;
   wherein a length of the upper graphite sheet is smaller than a length of the reflector plate, and a light shielding adhesive is disposed on the optical film, and the light shielding adhesive is attached to the reflector plate.

2. The backlight module according to claim 1, wherein the sealant frame is connected to the light source flexible printed circuit, and the sealant frame is connected to the reflector plate.

3. The backlight module according to claim 1, wherein a gap is provided between the light shielding adhesive and the upper graphite sheet.

4. The backlight module according to claim 1, wherein a lower graphite sheet is disposed under the light source flexible printed circuit, and the lower graphite sheet is connected to the light guide plate.

5. The backlight module according to claim 4, wherein the lower graphite sheet is attached to the light guide plate by means of a double faced adhesive tape.

6. The backlight module according to claim 1, wherein the reflector plate is attached to the sealant frame by means of a double faced adhesive tape.

7. The backlight module according to claim 1, wherein the light source flexible printed circuit is attached to the sealant frame by means of a double faced adhesive tape.

8. The backlight module according to claim 1, wherein the optical film includes an upper prism sheet, a lower prism sheet and a diffusing sheet arranged sequentially from top to bottom.

9. The backlight module according to claim 1, wherein a lower graphite sheet is disposed under the light source flexible printed circuit, and the lower graphite sheet is connected to the light guide plate.

10. The backlight module according to claim 9, wherein the lower graphite sheet is attached to the light guide plate by means of a double faced adhesive tape.

11. The backlight module according to claim 10, wherein the optical film includes an upper prism sheet, a lower prism sheet and a diffusing sheet arranged sequentially from top to bottom.

12. The backlight module according to claim 9, wherein the reflector plate is attached to the sealant frame by means of a double faced adhesive tape.

13. The backlight module according to claim 12, wherein the light source flexible printed circuit is attached to the sealant frame by means of a double faced adhesive tape.

14. The backlight module according to claim 13, wherein the optical film includes an upper prism sheet, a lower prism sheet and a diffusing sheet arranged sequentially from top to bottom.

* * * * *